United States Patent
Banker

(10) Patent No.: US 6,772,934 B2
(45) Date of Patent: Aug. 10, 2004

(54) KINETIC ENERGY WELDING PROCESS

(75) Inventor: John Banker, Boulder, CO (US)

(73) Assignee: Dynamic Materials Corporation, Boulder, CO (US)

(*) Notice: Subject to any disclaimer, the term of this patent is extended or adjusted under 35 U.S.C. 154(b) by 0 days.

(21) Appl. No.: 10/269,345

(22) Filed: Oct. 11, 2002

(65) Prior Publication Data

US 2004/0069832 A1 Apr. 15, 2004

(51) Int. Cl.$^7$ ............................................. B23K 20/08
(52) U.S. Cl. ................................. 228/107; 228/234.1
(58) Field of Search ....................... 228/115, 233.1, 228/234.1, 235.1, 107, 2.5, 3.1

(56) References Cited

U.S. PATENT DOCUMENTS

| | | | | |
|---|---|---|---|---|
| 2,316,112 A | * | 4/1943 | Temple, Jr. .................... 227/9 |
| 3,344,510 A | * | 10/1967 | Kameishi et al. ........... 228/107 |
| 3,434,197 A | * | 3/1969 | Davenport .................. 228/107 |
| 3,868,761 A | * | 3/1975 | Apalikov et al. ........... 228/107 |
| 3,987,529 A | * | 10/1976 | Nakagawa et al. ..... 29/890.129 |
| 4,762,754 A | * | 8/1988 | Nellis et al. ................. 505/124 |
| 5,050,789 A | * | 9/1991 | Bement et al. ............. 228/107 |
| 5,400,945 A | * | 3/1995 | Bergmann et al. .......... 228/107 |
| 5,474,226 A | * | 12/1995 | Joseph ...................... 228/112.1 |

FOREIGN PATENT DOCUMENTS

JP          61144287 A    *    7/1986

* cited by examiner

Primary Examiner—Kiley Stoner
Assistant Examiner—Kevin L McHenry
(74) Attorney, Agent, or Firm—Richard W. Hanes; Hanes & Schutz, P.C.

(57) ABSTRACT

A method of laminating a plurality of metal plates one to another, comprising steps of (a) arranging at least first and second generally planar metal plates having exposed surfaces into a spaced apart parallel relationship with one another, (b) anchoring the spaced apart plates to a fixed location, and (c) propelling a projectile against the exposed surface of the first plate with sufficient velocity to create a spot impact between the first and second plates of sufficient energy to create a metallurgical weld between the plates at the point of projectile impact.

9 Claims, 1 Drawing Sheet

KINETIC ENERGY WELDING PROCESS

FIELD OF THE INVENTION

The present invention relates to a process for uniting superposed metal plates to one another through one or more spot welds.

BACKGROUND OF THE INVENTION

Lamination of metal sheets has traditionally been done by "spot welding" that is an electric resistance welding process in which the overlapping metal sheets are disposed between a pair of electrodes between which a heavy current of short duration is passed. The high electrical resistance at the interface between the two metal sheets produces significant heating, causing the metals to melt at their interface and form a localized weld in that region. This process works well for many metals, particularly for steel. However, resistance spot welding does not work well for some metals, one being aluminum. The combination of tenacious high resistance surface oxides and low melting point make the process difficult at best when applied to aluminum. Traditional spot welding is also questionable in many instances when laminating different metals.

The difficulties with laminating some types of metals lead to the development of the explosion welding technique. This is a non-fusion welding process that welds metal plates together over large surface areas. The explosion welding technology employs a high velocity collision between two metal sheets to create micro-melting and metallurgical welding across their interfaces. The collision is created by subjecting one of the plates to the detonation of a high energy granular explosive charge applied over the full plate surface. The explosion accelerates the plate across a fixed distance to collide with the second plate. The process is typically applied to the lamination of large plates where continuous surface welding is desired.

While some semblance of spot welding can be achieved with small separated charges of explosive welding, when continuous welding is not required, the process is cumbersome, expensive and environmentally challenging requiring specialized equipment and off-site facilities to accommodate the violent nature of the explosions. Explosive welding is not suitable for high volume spot welds such as are required in automotive or aircraft assembly operations. Accordingly, a simpler, more effective process of spot welding obstinate materials is needed that can be readily adapted to industrial shop conditions.

It is therefore the primary object of the present invention to provide a novel process for laminating metal plates by a process of spot welding that relies on the kinetic energy of a projectile to produce the necessary welding energy.

SUMMARY OF THE INVENTION

The novel process of the invention involves the placing of metal sheets that are to be laminated in spaced apart parallel relation, one to another. The parallel sheets are then anchored or placed against a backstop to fix the position of the inside one of the two sheets. When the location of the spot weld is determined, a projectile is fired at the outside one of the two sheets. The kinetic energy of the projectile that is transferred to the outside plate by the projectile's impact with that plate accelerates a portion of the plate across the space between the two plates to create a high energy spot collision between the two plates that results in the plates being metallurgically welded together at the point of their impact.

DETAILED DESCRIPTION OF THE INVENTION

Figure 1:
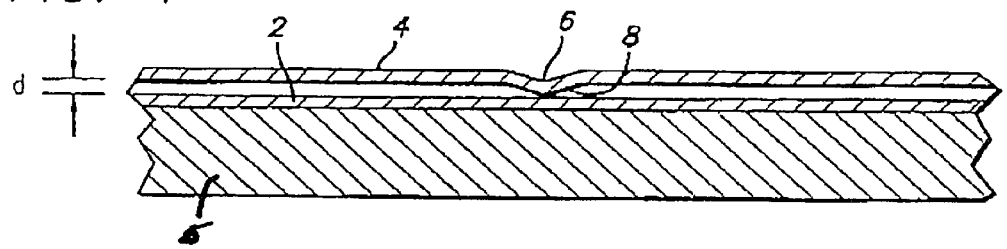
FIG. 1 is a cross sectional view of inside and outside metal sheets that are to be laminated, with the outside sheet being supported by a backstop, also shown in cross section.
Figure 2:
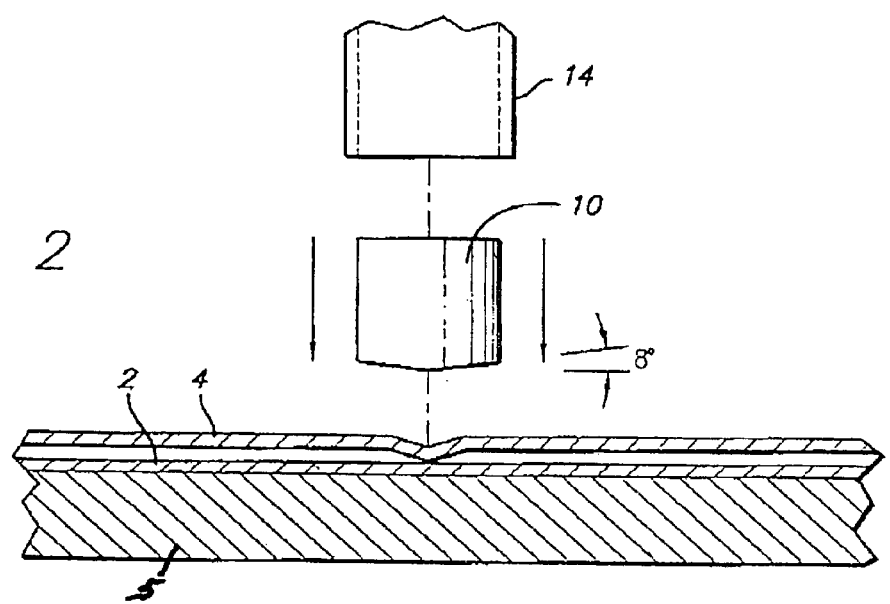
FIG. 2 is a cross sectional view similar to that of FIG. 1 and showing a projectile being propelled toward the desired location of a spot weld between the two metal plates.

The kinetic energy spot welding process of the present invention will be described in terms of its application to two 0.060 inch thick aluminum sheets 2 and 4, as shown in FIG. 1. One of the sheets 2, the inside sheet, is fixed to a sturdy backstop 5. The second, or outside sheet 4 is fixed in a parallel spaced apart relationship with the inside sheet 2 at a distance d. The spacing d between the two sheets is established by dimpling the outside sheet at 6 to produce an embossed under surface 8 having a depth equal to the predetermined spacing d between the sheets 2 and 4. For the sheets of the exemplar process the standoff spacing d between the sheets is equal to 0.030 inches.

The chosen projectile 10 for the aluminum sheets is a cylindrical slug of polyethylene plastic of 0.95 specific gravity that is one inch long with an outside diameter of 0.750 inches. The projectile is preferably pointed with an 8 degree tapered conical front face.

The power source for propelling the projectile 10 is a 12-gage shotgun with a muzzle 14. A shot gun shell is loaded with 25 grains of Red Dot gun powder and the projectile is appropriately loaded into the end of the shell. The distance between the muzzle 14 of the shotgun and the inside plate 2 is approximately five (5) feet.

Figure 3:
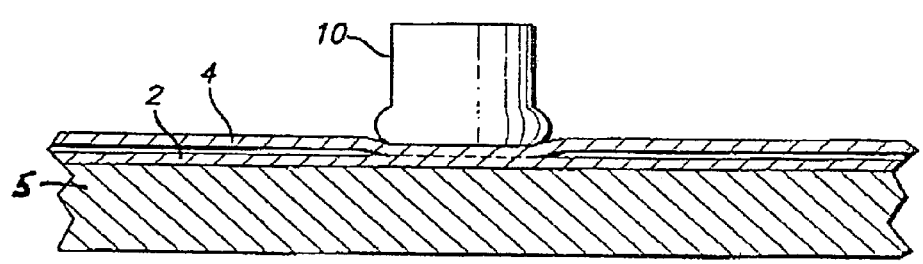
FIG. 3 is a cross sectional view similar to those of FIGS. 1 and 2 and showing the weld formed by the collision of the inside and outside plates at the point of impact of the fired projectile.

The firing of the shotgun propels the projectile 10 against the outside aluminum sheet 4, as shown in FIG. 3, causing the spot of aluminum impacted by the projectile to accelerate across the standoff space d and make high energy contact with the opposing spot on the inside aluminum sheet 2. Following the impact of the projectile 10, and as a result of the energy transferred from the projectile, the sheets of the exemplar process are heated and welded together in a circular pattern of approximately 0.6 inches in diameter directly beneath the point of projectile impact on the outside sheet 4.

In the exemplar process the projectile weighed 6.1 grams while that portion of the aluminum sheet 4 that was accelerated across the standoff space was approximately 1.05 grams, making the ratio of projectile mass to accelerated metal mass 5.7.

Obviously, the scope of the present invention is not intended to be limited to the specifications given for the exemplar process. Based on the given specifications, those skilled in the art can devise the process specifications for other metals to be laminated, including metals of different types. Although a shotgun loaded with a deflagrating charge has been described as the power source for the projectile in the described embodiment of the inventive process, other sources can be effectively employed. For example, pneumatic pressure, the force of gaseous combustion or the mechanism of a nail gun, to name a few, can propel the projectile.

The mechanical properties of the projectile, such as weight, size and ductility should be chosen in connection with the power source to achieve the required kinetic energy to cause the weld to take place, but at the same time not to substantially damage the surface of the plate that receives the impact.

The process is certainly not limited to aluminum, however it is best suited to applications employing low density, low melting point metal such as aluminum and magnesium.

I claim:

1. A method of laminating a plurality of metal plates one to another, comprising;
    arranging at least first and second generally planar metal plates having exposed surfaces into a spaced apart parallel relationship with one another;
    anchoring the spaced apart plates to a fixed location;
    propelling a projectile against the exposed surface of the first plate with sufficient velocity to create a spot impact between the first and second plates of sufficient energy to create a metallurgical weld between the plates at the point of projectile impact.

2. The method of claim 1 where the mass and ductility of the projectile are selected to affect energy transfer to the first metal plate that will accelerate the first plate across the standoff space between the plates to impact the other plate without significant damage to the surface of the first plate.

3. The method of claim 1 where the projectile is propelled by the force of a gun powder explosion.

4. The method of claim 1 where the projectile is propelled by pneumatic pressure.

5. The method of claim 1 where the projectile is propelled by the force of gaseous combustion.

6. A method of uniting laminar metal plates with a plurality of spot welds, comprising;
    superposing first and second generally planar metal plates, into a substantially parallel spaced apart relationship with one another;
    anchoring the second spaced apart plate to a fixed position;
    propelling a slug against the first plate with sufficient velocity to create a spot impact of the plates against one another of sufficient energy to create a metallurgical weld between the plates beneath the spot of slug impact.

7. The method of claim 6 and further including the step of;
    dimpling the upper surface of the first plate to create a lower surface projection that establishes the spacing between the first and second plates.

8. The method of claim 7 where the location of the dimple is coexistent with the location of slug impact with the upper surface of the first plate.

9. A method of uniting laminar metal plates with a plurality of spot welds, comprising;
    superposing a plurality of generally planar metal plates into a substantially parallel spaced apart relationship with one another where one of the plates comprises a first outside plate and another of the plates comprises a second outside plate;
    anchoring the second outside plate to a fixed position;
    propelling a slug against the first outside plate with sufficient velocity to impact of the plurality of plates against one another with sufficient energy to create a metallurgical weld area between the plurality of plates that is substantially coincident with the spot of slug impact.

* * * * *